April 8, 1958  J. L. BRUSCA  2,829,933
PILLOW BLOCKS

Filed Nov. 30, 1955  2 Sheets-Sheet 1

INVENTOR:
JOSEPH LORETTO BRUSCA
BY
Howson & Howson
ATTYS.

April 8, 1958    J. L. BRUSCA    2,829,933
PILLOW BLOCKS

Filed Nov. 30, 1955    2 Sheets-Sheet 2

INVENTOR:
JOSEPH LORETTO BRUSCA
BY
Howson & Howson
ATTYS.

United States Patent Office 2,829,933
Patented Apr. 8, 1958

2,829,933
PILLOW BLOCKS

Joseph Loretto Brusca, Cheltenham, Pa., assignor to S. K. F. Industries, Inc., Philadelphia, Pa., a corporation of Delaware Application November 30, 1955, Serial No. 549,992

3 Claims. (Cl. 308—194)

This invention relates to pillow blocks of the type adapted for rolling bearings and a primary object of the invention is to provide an improved block of this class as more specifically set forth below.

A specific object of the invention is to provide a pillow block of the stated class wherein provision is made for self-alignment of the bearing in the block but wherein also creeping rotation of the outer race ring of the bearing within the block is precluded.

Another object of the invention is to provide a novel device for preventing the aforesaid creeping rotation of the outer race ring of the rolling bearing while still affording freedom for movement of the outer race ring in the block adequate for the self-aligning function.

Another object of the invention is to provide a pillow block of the stated class wherein the block may be adapted without modification of the rolling bearing for use either at the "held" end of an axially-stabilized shaft or at the floating end of said shaft.

In respect to the latter adaptation, another object of the invention is to provide in conjunction with the self-aligning and creep-precluding devices, a means for providing axial floating movements of the bearing in the block.

The invention resides further in certain structural and mechanical details hereinafter described and illustrated in the attached drawings wherein.

Figure 1:
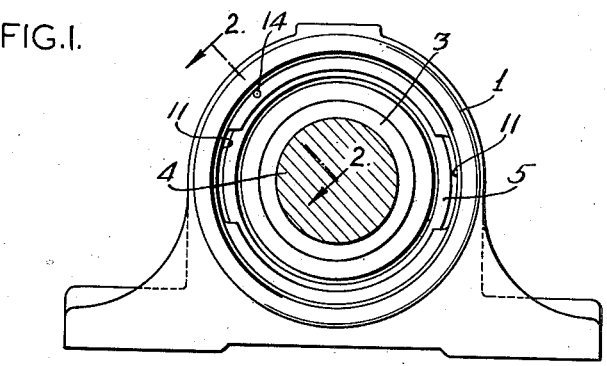
Fig. 1 is a side elevational view of a pillow block of the type to which the applicant's invention relates.
Figure 2:
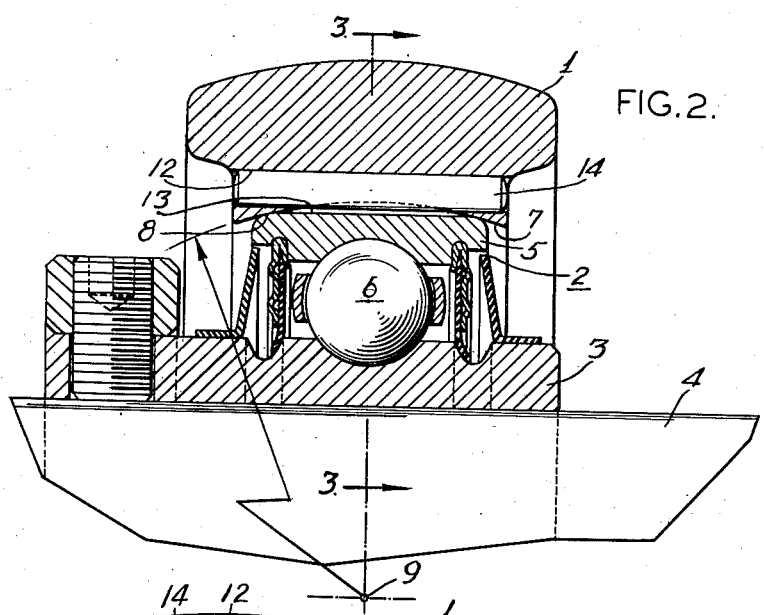
Fig. 2 is a fragmentary axial sectional view on an enlarged scale of the pillow block and bearing assembly taken on the line 2—2, Fig. 1 and including a section of shaft journalled in the bearing.
Figure 3:
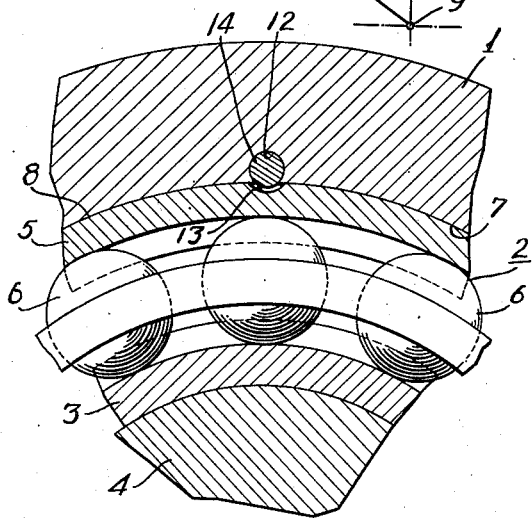
Fig. 3 is a fragmentary sectional view on the line 3—3, Fig. 2.
Figure 4:
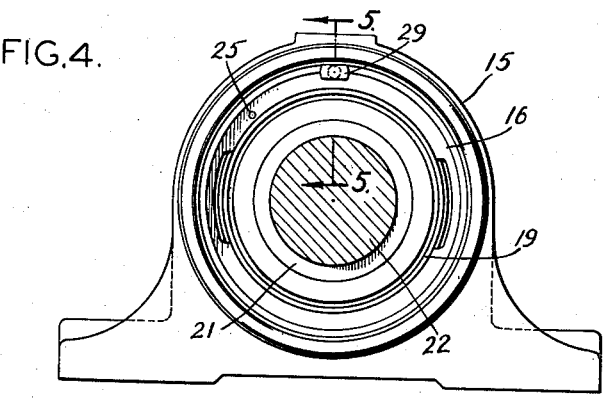
Fig. 4 is a side elevational view corresponding to Fig. 1 but illustrating the pillow block as adapted for support of the floating end of an axially-immobilized shaft.
Figure 5:
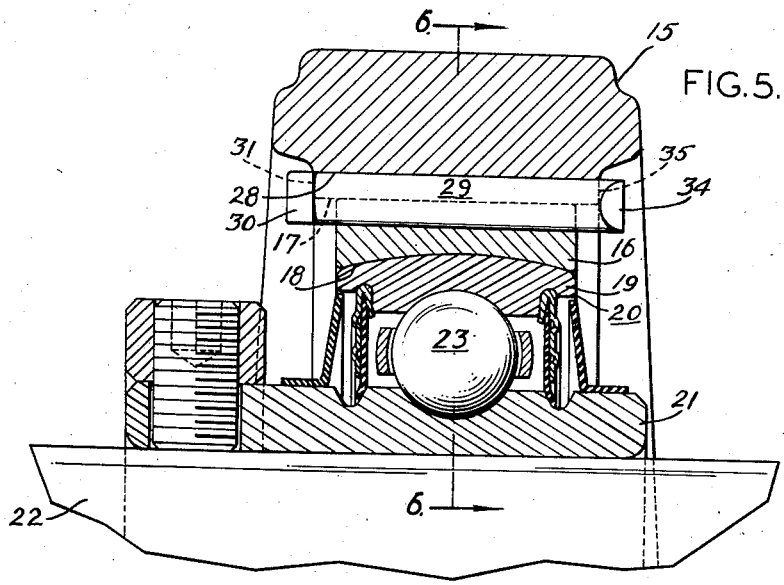
Fig. 5 is an enlarged sectional view on the line 5—5, Fig. 4.
Figure 6:
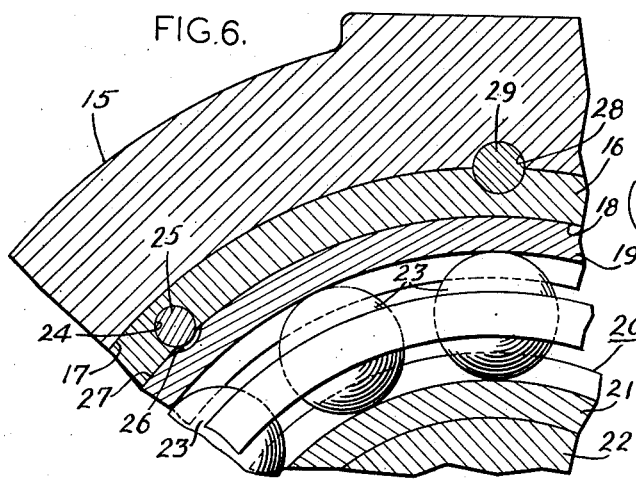
Fig. 6 is a sectional view on the line 6—6, Fig. 5.
Figure 7:
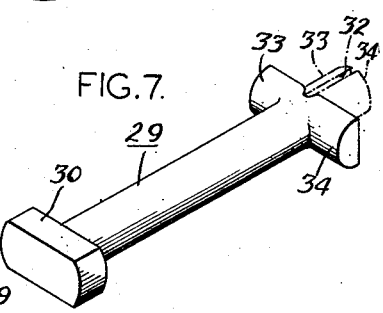
Fig. 7 is a view in perspective of one of the elements of the block assembly illustrated in the immediately preceding figures.

With reference to Figs. 1 to 3 of the drawings, the block comprises the usual housing 1 which may be of conventional form, except as hereinafter set forth, and which receives and supports the rolling bearing 2 in well known manner. The bearing 2 in the present instance comprises an inner race ring 3, which in practice is fitted or otherwise secured to a shaft 4, an outer race ring 5 which is seated in the block 1, and the rolling elements 6 which in the present instance are in the form of spheres.

In accordance with the present invention, the block 1 is provided with an inner annular surface 7 of spherical form, and the race ring 5 is provided with a corresponding external spherical surface 8 which seats in the surface 7 of the block. The common center of the spherical surfaces 7 and 8 lie at a point 9 on the rotary axis of the assembly. In order to admit the bearing 2 to the block with the outer race ring seated as described in the spherical surface 7, the block is provided with axial recesses 11, 11, 180° apart at opposite sides of the block which, when the bearing is turned about a vertical axis through an angle of 90° from the assembled position in which it is shown in Fig. 2, will either admit or permit withdrawal of the bearing including the inner and outer rings 3 and 5 to or from the block. When the bearing is assembled with the block as shown in Fig. 2, it will be apparent that the bearing will be universally adjustable in the spherical seat 7.

In accordance also with the invention, the block 1 is provided with an axially extending cylindrical bore 12, the midportion of which intersects the spherical surface 7. Also the outer ring 5 is provided with an axially extending recess 13 which intersects the spherical surface 8, and for a reason hereinafter described, this recess is of cylindrical contour in cross section and of greater radius than the bore 12 as illustrated in Fig. 3. The bore 12 is adapted for reception of a pin 14 the midportion of which accordingly intersects the surface 7 and, when the recess 13 is aligned with the pin, will also intersect the midportion of that recess. The pin 14 then functions to limit the angular movements of the outer race ring 5 in the seat 7 both in the radial planes containing the axis of the bearing and also in the plane normal to said axis so that while freedom for movement is afforded of magnitude adequate for the self-aligning function, the ring 5 is still prevented from drifting around the axis of the bearing when the shaft 4 is rotated.

The pillow block described above makes no provision for axial movements of the bearing and is, therefore, adapted for use at the "held" end of an axially-stabilized shaft. A pillow block having the same self-aligning and other characteristics of the block described above, but adapted for use at the floating end of the same or other similarly axially-stabilized shaft is illustrated in Figs. 4, 5, 6 and 7.

In this case, the pillow block 15 comprises an inner separate annular member 16 which is guided on the inner cylindrical surface 17 of the block for axial movement with respect to the relatively fixed block body of which said surface is a part. The annular member 16 contains the inner annular spherical surface 18 which forms the seat for the outer race ring 19 of the rolling bearing 20 corresponding to the bearing 2 of the pillow block assembly illustrated in Fig. 1. As in that case, the bearing 20 comprises an inner race ring 21 which in assembly is fitted or otherwise secured to a shaft 22; and includes also the spherical rolling elements 23 which are confined between and in the race rings 19 and 21. In all respects, this rolling bearing may correspond to the bearing 2 of the previously described pillow block assembly.

In order to afford the self-aligning characteristic in this instance and at the same time to prevent creeping rotation of the outer race ring within the block, the member 16 is provided with an axially extending cylindrical bore 24 which at its midportion intersects the spherical surface 18 and which receives a pin 25, the mid-portion of which also intersects said spherical surface. The outer race ring 19 is provided with an axially extending recess 26 of cylindrical cross sectional contour which intersects the midportion of the spherical outer surface 27 of the ring, and in assembly the pin 25 will intersect the recess 26 with clearance providing for the self-aligning movements of the bearing in the member 16 while preventing the aforesaid creeping movement of the outer race ring.

The pillow block in this case is provided with an axially extending bore 28, an outer longitudinal portion of which lies in the surface 17 whereas the complementary inner portion lies in the confronting face of the member 16. This bore receives a pin 29 which has a head 30 at one end which engages one end face 31 of the pillow block and which is split longitudinally at the other end as shown at 32 in Fig. 7 so that the portions 33 and 34 at opposite sides of the slit may be turned outwardly to abut the opposite end face 35 of the block. The member 16 of the block is of lesser axial extent than the space between the end faces 31 and 35 so that there is clearance between the head 30 and the turned out portions 33 and 34 of the pin and the respective opposite end surfaces of the member 16. This clearance affords limited axial movement of the member 16 with respect to the relatively fixed body portion of the block, this axial movement being limited by the head 30 and the terminal portions 33 and 34 of the pin. At the same time, the pin acts to immobilize the member 16 against angular movement about the axis of the bearing.

The pillow block assembly illustrated in Figs. 4 to 7 has all of the desirable characteristics of the assembly illustrated in Figs. 2 and 3 and provides additionally for axial movements of the bearing 20 to accommodate expansion and contraction of the shaft 22. It is, therefore, well adapted for supporting the floating end of an axially-stabilized shaft, as set forth.

I claim:

1. In a pillow block having an internal annular surface of spherical form, a rolling bearing comprising an outer race ring having an outer surface of spherical form corresponding to and adapted to seat in the spherical surface of the block, means for introducing the ring into said seat, and means for limiting angular movement of said ring in the seat about the spherical center of the latter, an annular member in said block embracing the race ring and having in its inner face the spherically formed surface which provides the seat for said ring, means for guiding said annular member for axial movement in the block and means for limiting the extent of said axial movement, and means for immobilizing the said member against angular movement in the block about the axis of the bearing, immobilizing means consisting of a cylindrical axially extending socket having complementary portions in the member and in the confronting block surface, and a pin mounted in said socket and intersecting both of the complementary portions.

2. A pillow block according to claim 1 wherein the means for limiting axial movement of the annular member consists of abutments on said pin engageable with end surfaces of the block including those of the said member, the axial dimension of the said member being less than that of the said confronting block surface so as to afford clearance between the said ends of the member and said abutments.

3. A pillow block according to claim 2 wherein the pin which constitutes the means for immobilizing the annular member against angular movement about the axis of the bearing comprises a head at one end which constitutes one of the said abutments and is longitudinally split at the opposite end to provide terminal portions which may be turned at an angle to the longitudinal center line of the pin so as to constitute the said block-engaging abutment at the opposite end of the pin.

References Cited in the file of this patent

UNITED STATES PATENTS

| 2,271,511 | Doughty | Feb. 3, 1942 |
| 2,290,213 | Shafer | July 21, 1942 |
| 2,397,164 | Shafer | Mar. 26, 1946 |
| 2,451,115 | Pew | Oct. 12, 1948 |